United States Patent [19]

Hrovat

[11] 4,212,378

[45] Jul. 15, 1980

[54] DEVICE FOR DE-ICING POWER CABLES

[76] Inventor: Henry J. Hrovat, 1121 W. 9th St., Newton, Kans. 67114

[21] Appl. No.: 919,077

[22] Filed: Jun. 26, 1978

[51] Int. Cl.² .............................................. B60L 5/02
[52] U.S. Cl. ...................................................... 191/62
[58] Field of Search ............... 191/62, 33 R; 104/279, 104/280

[56]     References Cited
         U.S. PATENT DOCUMENTS

| 710,516 | 10/1902 | Root ...................................... 191/62 |
| 967,051 | 8/1910 | Poe ........................................ 191/62 |
| 2,915,019 | 12/1959 | Tieman ................................. 104/279 |

Primary Examiner—Richard A. Schacher
Attorney, Agent, or Firm—John A. Hamilton

[57]     ABSTRACT

A device for de-icing power cables consisting of one or more wheeled dollies mounted for rolling movement along a cable, being movable along the cable by "loping" of the cable in wind when ice has formed on the cable, and having scrapers thereon capable of removing ice from the cable, and arms affixed transversely to the cable at intervals therealong and having unequal weights carried at their extended ends, the arms serving as stops to limit the rolling movement of the dollies, and by rocking movement thereof induced by wind, to apply torsion to the cable to loosen ice formed on the cable.

9 Claims, 7 Drawing Figures

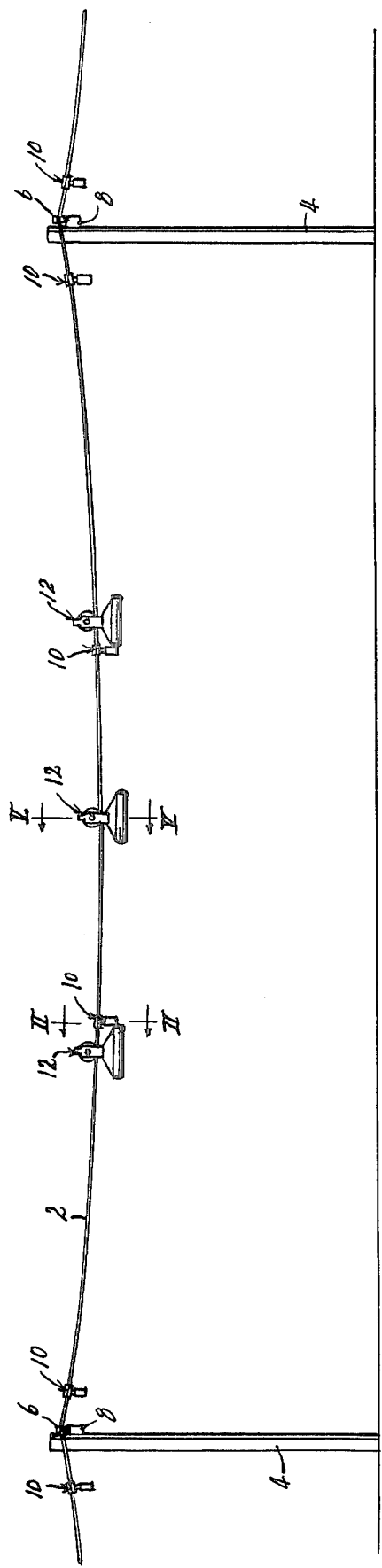
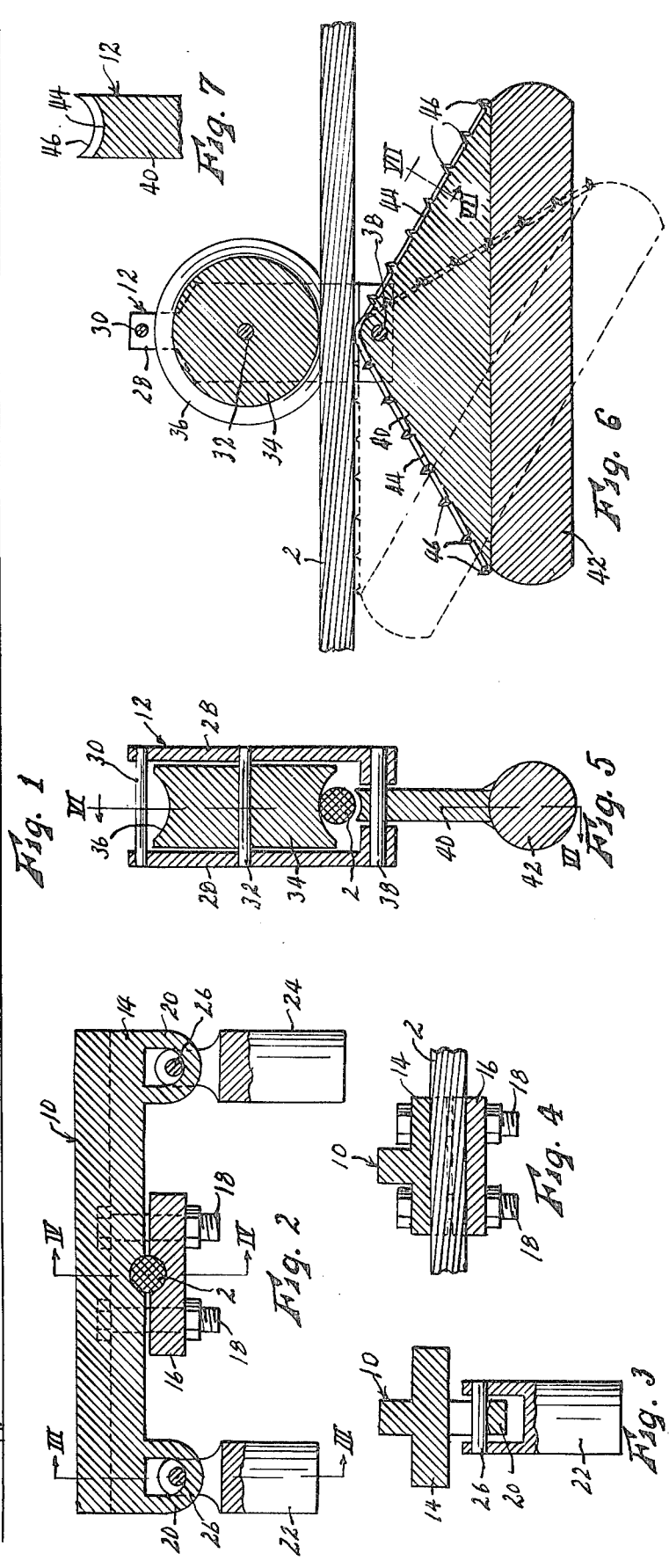

DEVICE FOR DE-ICING POWER CABLES

This invention relates to new and useful improvements in devices for de-icing power cables strung between the upper ends of poles or masts fixed in the ground.

The problems resulting from ice forming on power cables, particularly in rural areas, are of course well known, including breakage of the cables themselves, breakage of the poles on which the cables are supported, and of the cross arms of said poles, and partial burning of the cables caused by short-circuiting contacts between adjacent cables when a plurality of cables are carried by the same pole, the latter occurrence resulting in reduced power-carrying capacity of the cables and causing partial power failures, or "brown-outs" over wide areas. The elimination of these problems, in view of their tremendous costs both in repairs and also in inconvenience to power customers, as well as possible serious fires and other accidental damages, is therefore a matter of universal concern, and the solution of the problems has been the subject of many attempts, none, however, having been entirely successful, and none functioning on the principles set forth in the present invention.

The present invention is based on the observed fact, derived from many years experience in the field, that ice damage to power cables does not result alone from any ice accumulating on the cables, but from the action of wind on the cables after the ice begins to form. That is, after the ice begins to form, the action of wind blowing past the cable tends to set up a whipping motion in the cable, probably due to the fact that ice on the cable changes its cross-sectional configuration to constitute irregular "airfoils." This whipping motion asumes a sinuous wave form, often called "loping" of the cable. This loping action multiplies the tensile stresses in the cable, and if severe can cause breakage of the cable, or of the poles or their cross arms. It can also cause momentary short-circuiting contacts of a cable with other cables strung on the same set of poles, resulting in burning thereof to weaken them structurally and to reduce their power capacity. The essential observation is that the loping of the cable results from a combination of icing and wind. A cable will not ordinarily lope, even in a high wind, unless ice has formed thereon at least to some extent, while ice accumulated on the cable will not be troublesome unless wind is also blowing, since the cables and poles are usually of sufficient strength to support any amount of ice which can accumulate on the cable, as long as the ice load is stationary, or "quiet."

Accordingly, a primary object of the present invention is the provision of a de-icing device which is wind-actuated, and also depends for its actuation on loping of the cable. Thus the de-icing operation requires no external power source other than the wind, such as mechanical operators or electric current as used in cable heaters, and the de-icing operation occurs only when needed, that is, when conditions causing loping of the cable are prevailing, in that the wind is blowing and ice has at least begun to form on the cable. Generally, this object is accomplished by the provision of wheeled dollies movable along the cable and including scrapers capable of dislodging ice from the cable as the dolly moves therealong. The dollies are propelled along the cable by gravity as they ride the down wides of sinuous wave forms generated in the cable by loping thereof.

Another object is the provision of a de-icing device of the character described including means encouraging each dolly to move continuously along the cable, first in one direction and then the other, whereby to maintain a continuous scraping action, so long as loping of the cable continues. This object is accomplished by affixing stops to the cable at spaced points therealong, with a dolly between each consecutive pair of stops. Thus when a dolly is propelled against a stop, its movement is arrested and it will remain against the stop until the slope of the sinuous wave form of the cable at that point is reversed to slope downwardly away from the stop, whereupon the dolly will roll in the opposite direction. The stops also serve to prevent damage to the pole insulators by the dollies, and by dividing a cable span into sections each having a dolly movable therealong, compensate for the fact that loping of a cable span is sometimes confined to only a section of its length, so that at least one dolly will be activated regardless of the portion of the cable span which may lope.

A further object is the provision of a de-icing device of the character described including means for assisting the dollies and their scrapers in the removal of ice from the cable. This additional means includes rigid torsion arms affixed to the cable at intervals therealong and extending transversely thereto, with preferably unequal weights suspended from the ends of each arm. Action of the wind on these arms causes them to swing, applying torsion to the cable intermediate said arms. This tends to crack or otherwise loosen any ice on the cable.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view, not to scale, of a span of power cable between two consecutive supporting poles, with a de-icing device embodying the present invention operatively mounted thereon, FIG. 2 is an enlarged sectional view, to scale, taken on line II—II of FIG. 1, FIG. 3 is a sectional view taken on line III—III of FIG. 2, FIG. 4 is a fragmentary sectional view taken on line IV—IV of FIG. 2, FIG. 5 is an enlarged sectional view, to scale, taken on line V—V of FIG. 1, FIG. 6 is a fragmentary sectional view taken on line VI—VI of FIG. 5, and FIG. 7 is an enlarged, fragmentary sectional view taken on line VII—VII of FIG. 6.

Like reference numerals apply to similar parts throughout the several views, and the numeral 2 applies to a power transmission cable, which usually constitutes a large number of conductor wires twisted together in rope form, although its specific form is not pertinent to the present invention. Illustrated is a single full span of the cable supported between a pair of consecutive ground-supported poles 4, and portions of adjacent spans. The cable is affixed, at each pole, to an insulator 6 mounted on a cross arm 8 of the pole. This cable support system, in various forms, is of course common and well known. A cable span length between consecutive poles of about 270 feet may be presumed as typical.

The de-icing device as contemplated by the present invention includes a series (four shown) of stop-torsion arms secured to each span of the cable at spaced apart intervals therealong, and each designated generally by the numeral 10, and a series of wheeled dollies each designated generally by the numeral 12 mounted for rolling movement along the cable intermediate arms 10. As shown, an arm 10 is mounted on the cable closely adjacent each pole, with the other two arms 10 dividing the major portion of the span into three approximately equal lengths, with a dolly 12 mounted on the cable in each of these three lengths.

As best shown in FIGS. 2-4, each stop-torsion arm 10 comprises a rigid bar 14 extending normally generally in a horizontal position transverse to the cable, and affixed at its midpoint to the cable by a clamp plate 16 and bolts 18, the cable being received and clamped in matching generally semi-cylindrical grooves formed in the bar and clamp plate. At each end of bar 14 there is formed a transversely opening eye member 20 in which a pair of weights 22 and 24 are respectively suspended. Each weight is bifurcated at its upper end, a pin 26 fixed in the weight and extending across its bifurcation being engaged in the associated eye 20 to suspend the weight. The engagement of pins 26 in eyes 20 is quite loose, to permit free movement of the weights relative to bar 14, for reasons which will presently appear. Also for reasons to appear, the weights 22 and 24 are unequal in mass. Satisfactory operation has been demonstrated with a distance between the weights of about one foot, and with weight masses of five and seven pounds respectively, although these figures are exemplary only and not restrictive.

Each dolly 12, as shown in FIGS. 5-7, consists of a body portion consisting of a pair of vertical side plates 28 disposed respectively at opposite sides of cable 2. Said side plates are rigidly interconnected at their upper ends by a cross pin 30, and a horizontal wheel axle 32 extends between said side plates below said cross pin. A wheel 34 is rotatably mounted on said axle, and has rolling engagement with cable 2. The periphery of said wheel is preferably arcuately grooved, as indicated at 36, to assist in aligning it with the cable. Side plates 28 extend below the cable, and an axle 38 is affixed therein and extends transversely beneath the cable. A heavy, generally triangular plate 40, disposed normally beneath the cable and in the vertical plane thereof, with its apex directed upwardly, is pivoted adjacent its apex on axle 38, with its upper edges inclined downwardly away from the pivot, and with a heavy weight 42 welded or otherwise affixed to its lower edge. Each of the upper edges of plate 40 is transversely acruately grooved along its entire length, as indicated at 44, substantially to the cross-sectional curvature of cable 2, and a series of peripherally extending, longitudinally spaced apart ridges 46 are formed in each of said grooves. As will appear, said ridges function as ice scrapers, and are preferably sharpened to have cutting edges. With the proportions shown, a mass of about 30 pounds for weight 42 has been demonstrated to be effective, although this is of course also only exemplary, and not restrictive. The mountings of wheel 34 and weight 40 on axles 32 and 38 respectively is preferably accomplished by means of sealed ball bearings, roller bearings or the like, not shown, in order to permit as free and frictionless rolling of the wheel and pivoting of the plate as possible.

In operation, it will be seen that with four stop-torsion arms 10 and three dollies 12 mounted on a span of cable 2, the parts will generally assume the positions shown in FIG. 1, with one dolly at mid-span, and with the other two dollies resting against the outer sides of the arms 10 closest to mid-span, as shown, due to the sagging configuration of the cable. Then, whenever the wind blows, arms 10 tend to assume an angularly tilting or swinging movement due to the wind action on their weights 22 and 24, and since said arms are rigidly affixed to the cable, this angular swinging movement thereof applies a torsional strain to the cable, especially when adjacent arms swing in angularly opposite directions, as will occur at random. It has been found that the violence and amplitude of the swinging of said arms, and hence the degree of torsion applied thereby to the cable, is enhanced both by making weights 22 and 24 unequal in mass, and also by allowing free movement of said weights relative to bar 14, so that they fly about with a large degree of "action." If ice has formed on the cable, the torsion thus applied to the cable is effective to crack and loosen said ice. It is not, however, particularly effective in actually dislodging the ice from the cable so that it falls away, unless the wind velocity is high. The dollies 12 then come into play.

Mere formation of ice on the cable, without wind, will not cause the dollies to roll along the cable, nor will wind alone in the absence of ice on the cable, produce such dolly movement. However, if wind occurs after the formation of ice on the cable has begun, the action of the wind on the cable, the cross sectional contour of which has been changed by the ice formed thereon, will cause the cable to initiate a sinuous wave motion, or loping movement, as previously described. When, during this wave motion, the portion of the cable on which a given dolly rests assumes a downward slope, downward away from an arm 10 if that dolly is resting against said arm, the dolly will roll downwardly along the sloped portion of the cable by gravity. Moreover, since the cable waves are continuously moving, the dolly will continue its rolling movement, riding the "down" side of the wave in the same manner that a surf rider rides the "down" side of an ocean wave, either until the loping of the cable damps out, or until it is stopped by its engagement with one of arms 10. If it is stopped by engagement with an arm 10, it will remain there only until the wave form reverses, that is, until the side of the cable wave opposite to that on which the dolly was previously riding comes under the dolly, so that the cable slopes downwardly away from the arm, so that motion of the dolly is resumed, but in the opposite direction along the cable. Thus, so long as the loping of the cable continues, each dolly tends to roll back and forth on the cable between the two arms 10 associated therewith.

As the dolly moves along the cable, the heavy weight 42 carried thereby imposes sufficient weight on the contact between wheel 34 and the cable that it breaks away much of the ice which may have formed on the top of the cable. At the same time, wind action on weight 42, as well as movement of the dolly itself, cause plate 40 and weight 42 to swing freely on axle 38, which brings the ridges 46 at either side of the top edge of plate 40 into periodic contact with the lower side of the cable, as shown in dotted lines in FIG. 6, and these ridges scrape ice free from the cable. This ice removal by the dolly is possible even in the absence of torsion arms 10 to loosen or crack the ice, but is more efficient and thorough if the arms are also used, particularly if the cable ice is well-formed and solidly frozen.

Thus, while either arms 10 or dollies 12, each alone and without the other, could under certain circumstances of weather and ice conditions, serve as effective de-icing devices, their use in combination as shown provides a device which operates more effectively under a wider variety of weather conditions. Arms 10 have certain other functions in combination with the dollies 12. First, said arms act as stops limiting the movement of the dollies, particularly the endmost arms of each cable span serving to prevent the dollies from crashing into and breaking the insulators 6 by which the cable is mounted on the poles. Second, said arms divide the cable span into sections each carrying a dolly. This compensates for the fact that the lope of the cable may not extend the full length of a span, but be concentrated at times in one section thereof and damped out before reaching other sections thereof, by providing that regardless of the cable section which actually assumes a loping motion at any given time, there will be a dolly present in that section to be propelled thereby. The number of arms 10 and dollies 12 mounted on a span of cable will be determined by the length of the cable span, a distance of no greater than about 100 feet between successive arms 10 having been found effective.

While I have shown and described a specific embodiment of my invention, it will be readily apparent that many minor changes of structure and operation could be made without departing from the spirit of the invention.

What I claim as new and desire to protect by Letters Patent is:

1. A device for de-icing a span of a power cable supported between a pair of gound-supported pales, said device comprising:
   a. a dolly having a rotatable wheel engaging said cable for rolling movement therealong, said dolly comprising a body portion in which said wheel is mounted for rotation on an axis transverse to and above said cable,
   b. a weight of substantial mass, said weight being mounted on said body portion for free pivotal movement on an axis parallel to said wheel axis and extending transversely beneath said cable, and
   c. scraper members carried by said weight and normally not engaging said cable, but being operable responsively to pivotal movement of said weight on said body portion to move into scraping engagement with said cable.

2. A device as recited in claim 1 wherein said weight includes a substantially triangular plate disposed in the vertical plane of said cable and pivoted adjacent an apex thereof to said dolly body portion on a transverse axis just below said cable, the edges of said plate extending from said apex normally being downwardly inclined from said cable but being alternatively movable into engagement with said cable by pivoting of said plate in respectively opposite directions, said scraper members being mounted in spaced apart relation along said last named edges of said plate.

3. A device as recited in claim 1 with the addition of at least two stop members affixed to said cable in space apart relation therealong and each operable to prevent the passage of said dolly thereby, said dolly being engaged on said cable intermediate said stop members, whereby said stop members limit the movement of said dolly along said cable to prevent said dolly from damaging the connections of said cable to said poles.

4. A device as recited in claim 1 with the addition of a series of stop members affixed to said cable at spaced apart points along the length thereof, whereby to divide the length of the cable span into a series of shorter lengths, there being a plurality of said dollies each mounted on one of said shorter cable lengths between a consecutive pair of said stop members, the endmost stop members of said series being spaced apart from the connections of said cable to said poles.

5. A device as recited in claim 3 wherein each of said stop members comprises a short arm affixed intermediate its ends to said cable and extending transversely to said cable.

6. A device as recited in claim 5 with the addition of a weight suspended from each end of said arm.

7. A device as recited in claim 6 wherein the weights suspended from the respective ends of said arm are of unequal masses.

8. A device as recited in claim 6 wherein said weights are suspended from said arm by means permitting a substantial degree of free relative movement therebetween.

9. A device as recited in claim 8 wherein the weights suspended from the respective ends of said arm are of unequal masses.

* * * * *